(12) United States Patent
Mudric et al.

(10) Patent No.: US 11,063,862 B2
(45) Date of Patent: Jul. 13, 2021

(54) MEDIA PATH ENGINEERING FOR MULTI-HOMED DEVICES

(71) Applicant: Avaya Inc., Santa Clara, CA (US)

(72) Inventors: Dusan Mudric, Ottawa (CA); Ping Lin, Tottenham (CA)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/388,277

(22) Filed: Apr. 18, 2019

(65) Prior Publication Data
US 2020/0336416 A1    Oct. 22, 2020

(51) Int. Cl.
| | |
|---|---|
| *H04L 12/725* | (2013.01) |
| *H04L 12/717* | (2013.01) |
| *H04L 12/54* | (2013.01) |
| *H04L 12/707* | (2013.01) |
| *H04L 12/727* | (2013.01) |
| *H04L 12/721* | (2013.01) |
| *H04L 12/749* | (2013.01) |

(52) U.S. Cl.
CPC .......... *H04L 45/42* (2013.01); *H04L 12/5692* (2013.01); *H04L 45/12* (2013.01); *H04L 45/121* (2013.01); *H04L 45/24* (2013.01); *H04L 45/302* (2013.01); *H04L 45/306* (2013.01); *H04L 45/308* (2013.01); *H04L 45/72* (2013.01); *H04L 45/741* (2013.01)

(58) Field of Classification Search
CPC ... H04L 45/42; H04L 45/302; H04L 12/5692; H04L 45/121; H04L 45/306; H04L 45/308; H04L 45/12; H04L 45/741; H04L 45/24; H04L 45/72

USPC ......................................................... 709/243
See application file for complete search history.

(56) References Cited

U.S. PATENT DOCUMENTS

| | | | | |
|---|---|---|---|---|
| 2009/0141713 | A1* | 6/2009 | Beverly | ................ H04L 45/306 370/389 |
| 2011/0235525 | A1* | 9/2011 | Nishi | .................. H04L 41/5035 370/242 |
| 2018/0191679 | A1* | 7/2018 | Mulka | ..................... H04L 45/38 |

OTHER PUBLICATIONS

VoIP Desk "6 Ways Software-Defined Networking Gets More out of Your VoIP System," Toolbox, 2015, 4 pages [retrieved online Jul. 9, 2020 from: it.toolbox.com/blogs/voipdesk/6-ways-software-defined-networking-gets-more-out-of-your-voip-system-072315].
"How SDN Can Multiply VoIP Channel Capacity," Distributed Networking Associates, Inc., Sep. 16, 2014, 2 pages [retrieved online from: www.webtorials.com/content/2014/09/how-sdn-can-multiply-voip-channel-capacity.html].
Doyle "What does SDN mean for telecom infrastructure?" IDG Communications, Inc., Dec. 11, 2012, 4 pages [retrieved online from: www.networkworld.com/article/2162090/what-does-sdn-mean-for-telecom-infrastructure-.html].

\* cited by examiner

*Primary Examiner* — Tu T Nguyen
(74) *Attorney, Agent, or Firm* — Sheridan Ross P.C.

(57) ABSTRACT

A method of engineering media path selection is described. Addresses and media paths are selected using a media path selection policy. Additionally, a candidate address list may be considered. Using the media path selection policy, devices may select the first hop egress router and a remote default router for transferring data.

20 Claims, 11 Drawing Sheets

POLICY TABLE 800

| NAME | PREFIX | APPLICATION | MEDIA | PRECEDENCE | QUALITY |
|---|---|---|---|---|---|
| Remote ISP_1 | 2000:1:1aaaa::/48 | SIP | Voice | 2 | Fair |
| Remote ISP_2 | 2000:1:20a::/48 | IM | Video | 1 | Good |
| Remote ISP_3 | 2000:1:1bbb::/48 | GAMING | Video | 4 | Down |
| Remote ISP_4 | 2000:1:20bb::/48 | HTTP | Voice | 5 | Fair |
| Local ISP_5 | 2000:1:1ccc::/48 | SIP | Video | 2 | Excellent |
| Local ISP_6 | 2000:1:6cc::/48 | IM | Voice | 3 | Good |

MEDIA PATH ENGINEERING FOR MULTI-HOMED DEVICES

FIELD OF THE DISCLOSURE

The present disclosure is generally directed toward communications and more particularly toward media path and address selection for communications.

BACKGROUND

Communication devices are used for voice and video calling, video conferencing, gaming, Internet access, media streaming, data messaging, email, machine-to-machine data transfers, computerized information services, and the like. Communication devices exchange data with communication systems to provide these various data services. The communication devices may be phones, smartphones, computers, laptops, tablets, wearable devices, media players, intelligent machines, and the like. Communication systems may include Internet Protocol (IP) networks use to transfer data. IP networks may operate using protocols such as IPv4 and IPv6. IPv4 is the fourth version of the Internet Protocol (IP) and protocol used on packet-switched networks, such as the Internet. IPv4 operates on a best effort delivery model, in that delivery is not guaranteed. IPv6 is the most recent version of the IP and provides an identification and location system for devices on networks. IPv6 was developed to deal with address exhaustion on IPv4, which uses 32-bit addresses. Many devices can operate using both IPv4 and IPv6. Multi-homed or dual stacked devices are devices capable of communicating over multiple networks. For example, a multi-homed device may have interfaces to communicate over both IPv4 and IPv6 networks.

Internet Service Providers (ISPs) provide the service devices use to connect to the Internet and access websites. ISPs come in varying cost, quality, reliability, service, speed, etc. Web hosts are servers or devices that store the data and files that generate websites that are accessed by users. Currently, a two bit preference may be set to select between different prefixes, which allows selection of the preferred prefix.

It is desirable to transfer data over different media paths and/or ISPs and allow endpoint devices to select such media paths. It is also desirable to allow the host to select the remote ISP. The advantages of this method include disaster recovery; load balancing; and selection based on preference, application, availability, quality, etc.

SUMMARY

IPv4 and IPv6 both have their advantages and disadvantages. Embodiments of the present disclosure seek to exploit the advantages of both protocols by combining the approaches and engineering media path selection.

It is, therefore, one aspect of the present disclosure to provide a method of selecting addresses and media paths in a communication session comprising one or multiple media streams. In some embodiments, the communication session comprises a session between two or more devices. It should be appreciated that each device (originating and terminating) in the communication session may utilize the method described herein to select media paths for the associated media streams. It should be further appreciated that each device may select different media paths for egress and ingress. In some embodiments, selection of a media path comprises selecting a local egress address and a remote ingress address. It is another aspect of the present disclosure to provide a method for multihomed devices can select a source and destination address, based on an application driven policy table. Additionally, the policy table may consider the destination, service requirements, price, etc.

In this model a centralized system, such as a Personal Profile Manger (PPM) and/or Session Manager (SM) may generate and manage a media path selection policy. The media path selection policy may be location based and devices may transfer their candidate addresses to the PPM/SM. The PPM/SM transfers the media path selection policy to each device, and the device uses the policy to select a media path for each media stream. In some embodiments, an ISP assigns prefixes for addresses on their subnets, and a local and remote address is selected. For example, a preferred egress ISP is selected for the local site, and a preferred ingress ISP is selected for the remote site. For example, an application executing on a device may apply the policy to select local and remote addresses. The selected addresses will determine over which ISPs the media is transferred. The local address is used to traverse the selected local ISP and the remote address is used to traverse the selected remote ISP. Although, it is contemplated that each media stream will have a separate media path, it is possible for multiple media streams to be transmitted over a single media path. Media path engineering allows media paths to be selected based on ISP preferences. In other words, different applications can select different ISPs. For example, media content associated with a Web Browser can be transferred over a lower quality ISP, while data associated with a voice application can be transferred over a high-quality ISP. A router RFC allows a router to send a Router Advertisement message to hosts with two bits that specify the ISP preference, but since this is host based, all applications on that host will have the same preference. Currently, there is no option to specify an ISP for portions of the traffic, in order to send some traffic over a low-cost/quality ISP and important traffic over a high-cost/quality ISP. Furthermore, the RFC is for local ISPs only, the Router Advertisement message does not allow host applications to select remote ISPs.

In some embodiments, the multiple media streams of the communication session comprise media streams from a single application running on a single device. As an example, the communication session may comprise a video conference session using a video conferencing application with one media stream for video data and another media stream for voice data. In yet another embodiment, the multiple media streams comprise data from multiple applications running on a single device. As a non-limiting example, a device may be running a video streaming application simultaneously with a gaming application, each respective application transfers their application data over a separate media path. Continuing the example, each of the applications may also select media paths that are different than the media paths selected by the receiving end-point device. Currently, there is no way for host applications to select remote ISPs.

In yet other embodiments, if a client knows which ISP is preferred, the client can use address selection to send media over the preferred ISP. For example, the policy table may be sent to the host, the host performs a lookup in the policy table and requests candidate addresses. In some embodiments, the address is selected based on application. In other words, address selection allows a host/client to select addresses based on a preferred ISP. In an example, the sending device (e.g., host) selects a source address based on the policy table and selects a destination address based on the policy table and list from the destination device.

In dual mode networks, signaling may be over an IPv4 network and media over an IPv6 network. There is no flexible host end-to-end solution for media path engineering, using source and destination address selection on the hosts to make media flow over selected ISPs. A source address is used to route media to an egress ISP and a destination address is used to route media to an ingress ISP. In the current system, a device cannot send data using a specific ISP/address family (i.e. send voice over ISP-A and video over ISP-B using IPv6). Traditionally, a source address is selected by the host and the source address will determine which egress ISP is used. However, hosts are not aware of ISP preferences. Furthermore, if media over one ISP loses connectivity (i.e. due to service outage or disaster) there is no way for the media stream to be migrated to another ISP.

With media path engineering it is possible to select lower cost/lower quality ISPs/connections for non-critical transmissions. In addition, when more than one ISP is available, media path engineering allows for load balancing and recovery from service outages. Media path selection may be dynamic. In some embodiments, the application and/or device may monitor the connection to determine the quality of the connection, and transmit this information to the PPM/SM, which uses the information to manage/update the media path selection policy. The updated policy may be transferred to the device to select new media paths. In some embodiments, the device/application may use the original or updated policy to select a new media path in the event one of the selected media paths becomes unavailable/unreachable.

In other words, it is an aspect of the present disclosure to provide media path selection based on ISP preferences. In some embodiments, the media path selection policy may also be transmitted to hosts, so that hosts may select their addresses accordingly. For example, if the media path selection policy notes that certain prefixes are unreachable because an ISP is down, then the host can select their addresses based on the policy and not use the prefix for the unavailable ISP. Additionally, media path engineering allows enterprises to track the prefixes used by their sites.

In some embodiments, a method is provided that generally comprises:
receiving a media path selection policy;
receiving a list of destination addresses from a receiving node;
selecting a source address based on the media path selection policy;
selecting a destination address from the list of destination addresses based on the media path selection policy; and
transferring media using the selected source and destination addresses.

In some embodiments, a method is provided that generally comprises:
receiving a media path selection policy;
selecting a first media path for a first media stream among the multiple media streams based on the media selection policy;
transferring the first media stream over the first media path;
selecting a second media path different from the first media path for a second media stream among the multiple media streams based on the media selection policy; and
transferring the second media stream over the second media path.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous conferencing environments such as video conferencing environments, audio conferencing environments, multi-media conferencing environments, etc.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

Figure 1A:
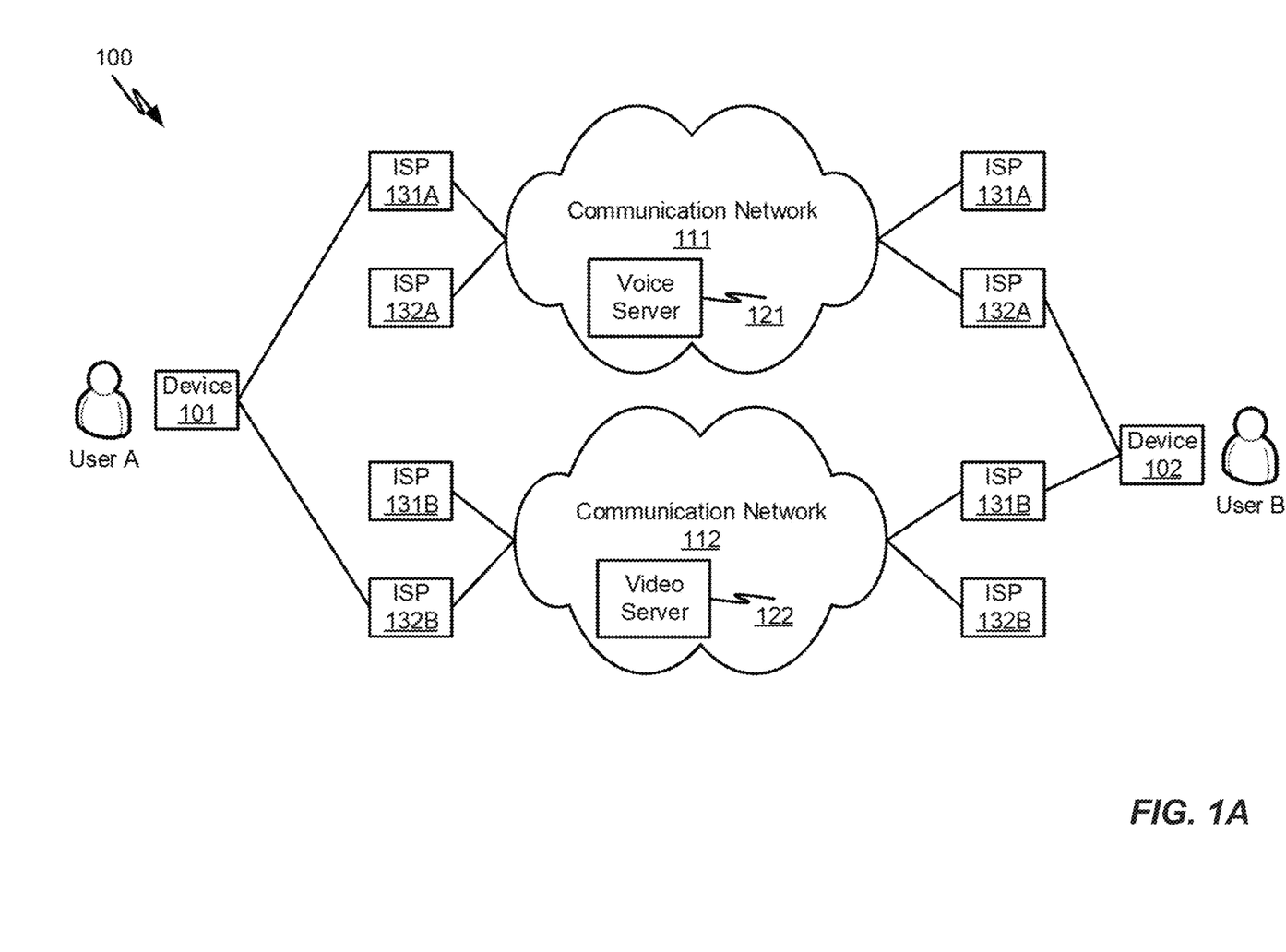
FIGS. 1A-B are block diagrams depicting a communication system in accordance with embodiments of the present disclosure.

With reference initially to FIG. 1A, an illustrative communication system 100 in which media path selection is facilitated as will be described in accordance with at least some embodiments of the present disclosure. The system 100 is shown to include devices 101-102 (operated by Users A and B, respectively), communication networks 111-112, voice server 121, video server 122, and ISPs131-132. In some embodiments, ISP 131A and 131B are the same ISP over different communication protocols.

In accordance with at least some embodiments of the present disclosure, the communication networks 111-112 may comprise any type of known communication medium or collection of communication media and may use any type of protocols to transport messages between endpoints. The communication networks 111-112 may include wired and/or wireless communication technologies. The Internet is an example of a communication network 111-112 that constitutes and Internet Protocol (IP) network consisting of many computers, computing networks, and other communication devices located all over the world, which are connected through many telephone systems and other means. Other examples of communication networks include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, an enterprise network, and any other type of packet-switched or circuit-switched network known in the art. In addition, it can be appreciated that communication networks 111-112 need not be limited to any one network type, and instead may be comprised of a number of different networks and/or network types. Moreover, communication networks 111-112 may comprise a number of different communication media such as coaxial cable, copper cable/wire, fiber-optic cable, antennas for transmitting/receiving wireless messages, and combinations thereof. In some embodiments, communication network 111 may correspond to a public network (e.g., the Internet) whereas network 112 may correspond to a private network administered by a private enterprise with personalized security rules.

In some embodiments, communication devices 101-102 may include a personal communication device or a shared communication device (e.g., a conference phone). Examples of suitable communication devices 101-102 include, without limitation, a telephone, a softphone, a cellular phone, a multi-speaker communication device (e.g., conference phone), a video phone, a PC, a laptop, a tablet, a PDA, a smartphone, a thin client, or the like. Communication devices 101-102 may be pure consumers of audio/video (e.g., having a speaker only and/or having a screen only), pure producers of audio/video (e.g., having a microphone and/or camera only), or consumers and producers of audio/video. It should be appreciated that communication devices 101-102 may be configured to support single or multi-user interactions with other network-connected devices within an enterprise communication network and/or across multiple communication networks. In the depicted embodiment, each communication device 101-102 has a single user associated therewith, but it should be appreciated that a single communication device may be shared by more than one user without departing from the scope of the present disclosure.

Voice server 121 and video server 122 may correspond to one or more servers (e.g., a single server or a server cluster) that facilitates the distribution and sharing of media between communication session participants. In some embodiments, voice server 121 and video server 122 may be configured to receive a plurality of media streams from each communication device 101-102 involved in a communication session and then distribute those streams to the other participants. Voice server 121 and video server 122 may, therefore, correspond to a video conference service. In still other embodiments, the functionality of voice server 121 and video server 122 may be incorporated into a single server or collection of servers that are co-located with one another. Voice server 121 and video server 122 may also use a policy table to select ISPs are described herein. For example, when media content is transferred from one user to another, it may be transferred via a Media Gateway (MGW), the MGW may use the policy table to select a preferred egress ISP and a remote ISP.

Voice server 121 and video server 122 may correspond to a device (e.g., server) or collection of devices that enable media compositing and distribution during a communication session between two or more and usually three or more session participants. In some embodiments, voice server 121 and video server 122 may include a media mixer and logic for distributing the composited media among the conference participants. Voice server 121 and video server 122 may even provide a fully-composited version of the conference to each participant or communication devices 101-102.

Figure 1B:
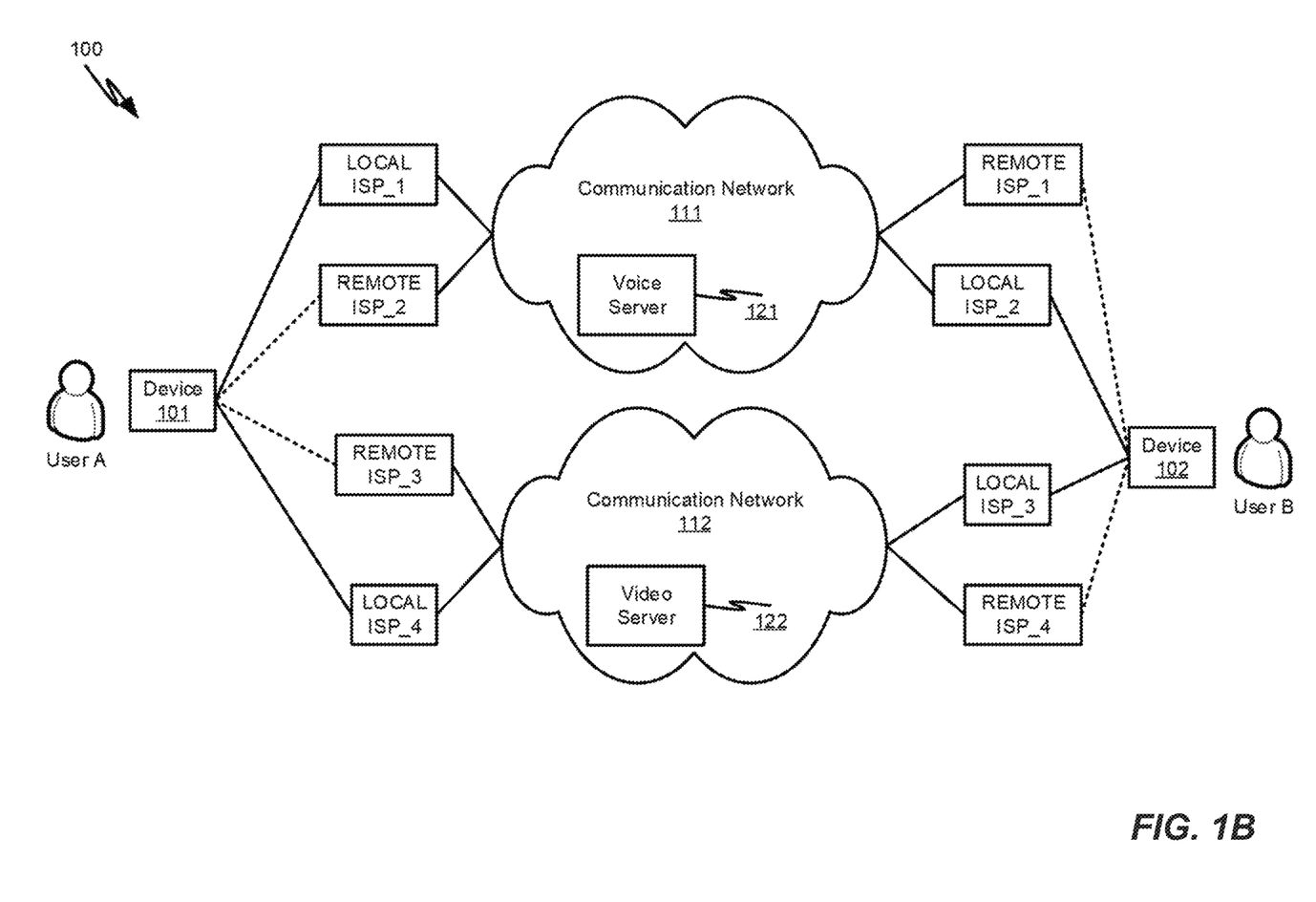

FIG. 1B further illustrates media path selection in accordance with at least some embodiments of the present disclosure. The system 100 is shown to include devices 101-102 (operated by Users A and B, respectively), voice server connected to communication network 111, and video server 122 connected to communication network 112.

As illustrated, each device 101 and 102 selects two ISPs, a local egress ISP and a remote ingress ISP. Device 101 selects (and transfers voice data over) local ISP_1/Remote ISP_1. Device 102 selects (and transfers voice data over) local ISP_2/Remote ISP_2. Device 102 selects (and transfers video data over) local ISP_3/Remote ISP_3. Device 101 selects (and transfers video data over) local ISP_4/Remote ISP_4. In other words, devices 101 and 102 send data to the local ISPs and receive data from the remote ISPs. By selecting two ISPs, each device selects the first hop egress router and a remote default router.

Figure 2:
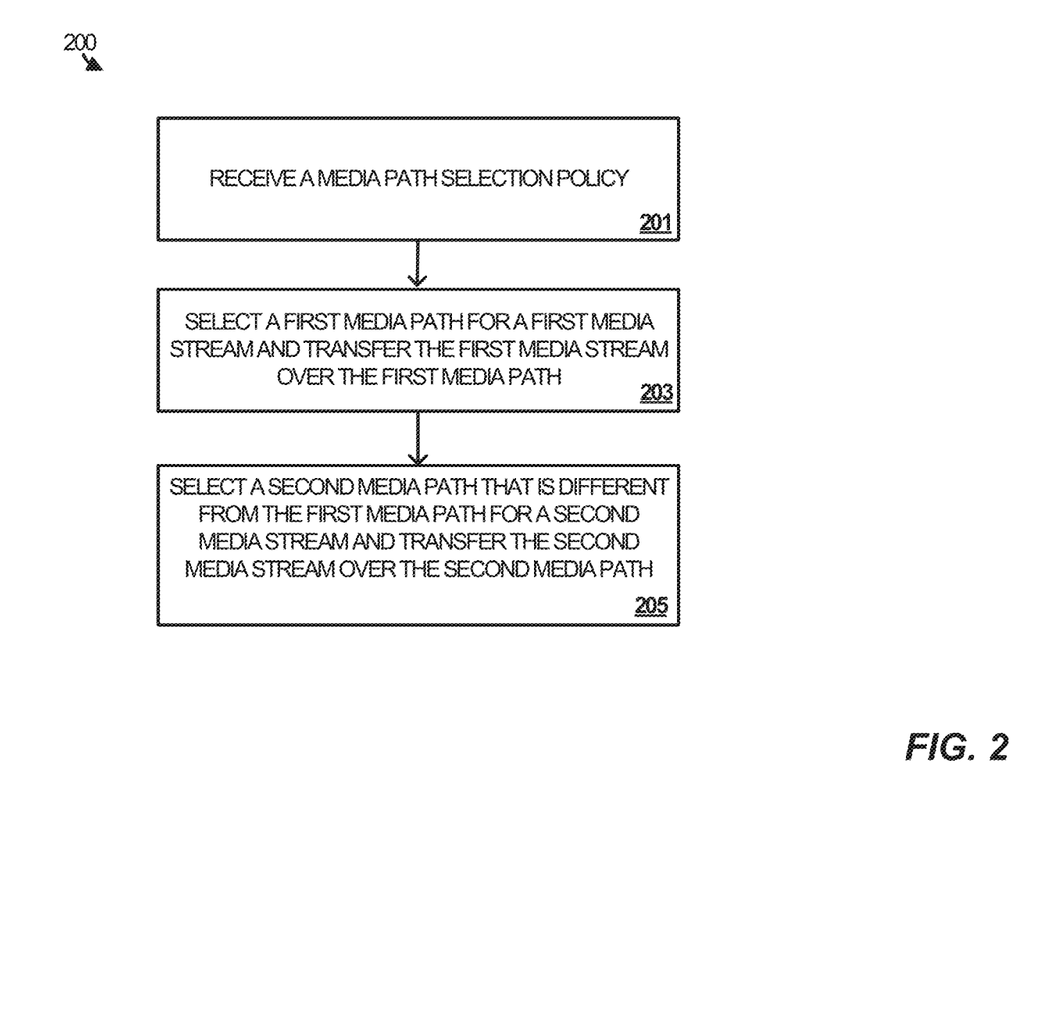
FIG. 2 illustrates a process for media path selection in accordance with embodiments of the present disclosure.

With reference now to FIG. 2, additional details of a process 200 for selecting media paths will be described in accordance with at least some embodiments of the present disclosure. The processes of operation 200 are referenced parenthetically in the paragraphs that follow, along with references to the elements and systems from communication system 100 of FIG. 1.

As illustrated in FIG. 2, operation 200, communication devices 101-102 receive a media path selection policy (step 201). The media path selection policy may be distributed by a centralized system, such as Personal Profile Manager or a Session Manager and may be location based. Communication devices 101-102 may be attempting to establish a connection to conduct a video conference. In some examples, the media path selection policy may be transferred from a website host. In other examples media path selection policy may be stored on communication devices 101-102. In some embodiments, devices 101-102 transfer their candidate addresses and the host may apply a remote media path selection policy to the transferred candidate addresses. The remote address and ISP may be selected based on the remote ISP preferences, which are configured for the local site.

Each of communication devices 101-102 selects a first media path for a first media stream and transfers the first media stream over the first media path (step 203). In some embodiments, the first media path selected is different for each device. As an example, the first media stream may comprise a media stream for the voice portion of the video conference, and voice data is transferred over the selected first media path. Additionally, each of communication devices 11-102 selects a second media path different from the first media path for a second media stream and transfers the second media stream over the second media path. Continuing the example for above, the second media stream may comprise the data for the video portion of the video conference, which is transmitted over the second media path.

In another example, communication devices 101-102 are communicating independently, and process 200 may be performed on each device to select media paths. Communication devices 101-102 may each be running multiple applications, such as audio streaming, gaming, video streaming, among other applications. Communication devices 101-102 may select a media path for each media stream associated with each application running on the device. For instance, if communication device 101 is running an audio streaming application and a gaming application, then audio data for the audio streaming application may be transmitted over a first media path and the game data associated with the gaming application may be transferred over the second media path.

Figure 3:
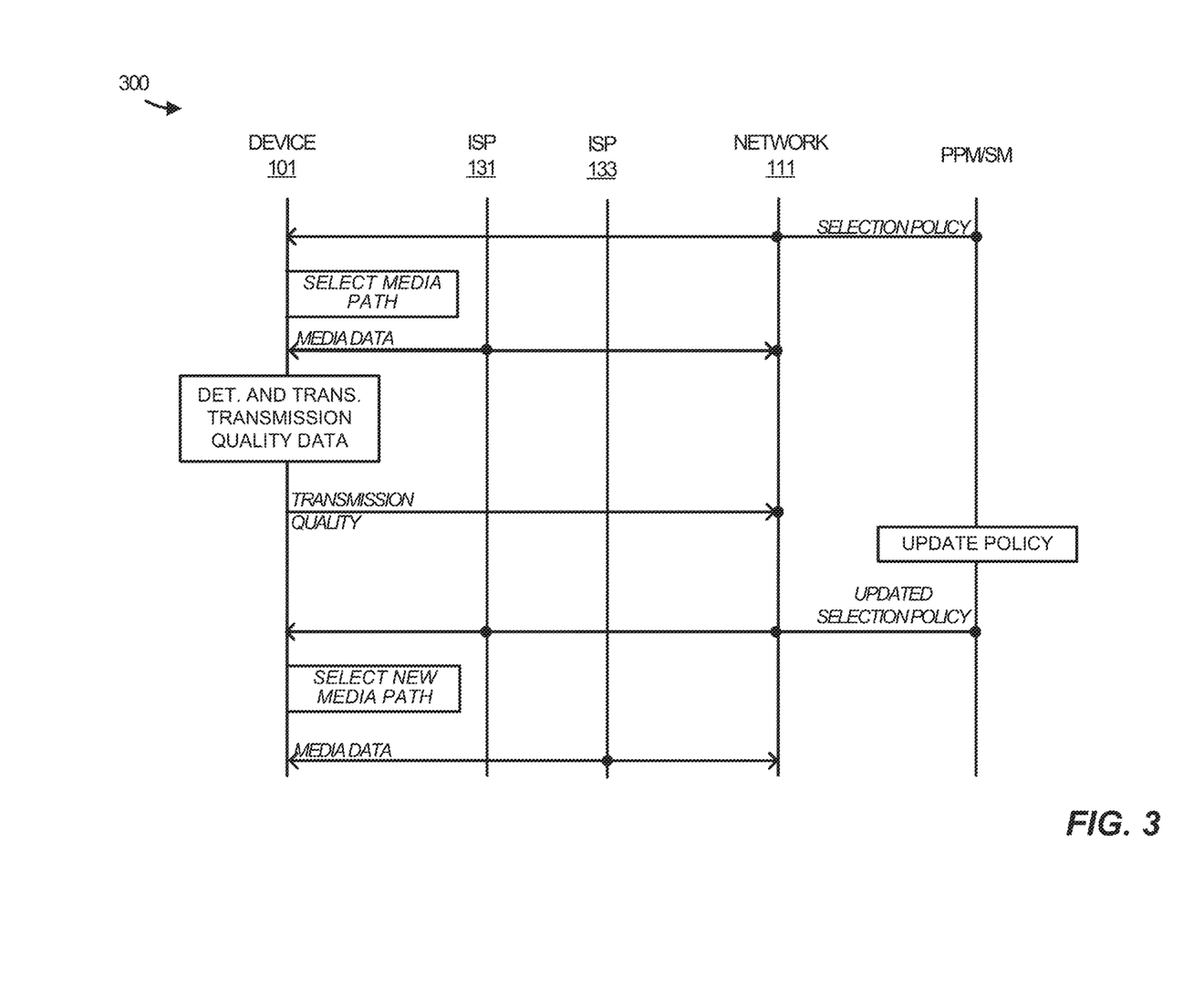
FIG. 3 is a flow diagram depicting media transfer using media path selection in accordance with embodiments of the present disclosure.

FIG. 3 illustrates an example flow of process 200 of communication device 101. In this example, communication device 101 is transfers data to network 111 for delivery to a host. For example, communication device 101 may be accessing a webpage hosted by the host. The website could comprise an audio streaming site. In this example, the PPM/SM transfers the media path selection policy data to communication device 101. In some embodiments, the media path selection policy data is stored in a table, although other formats are possible. In some embodiments, a separate device/system may select the media paths and provide addresses for the selected paths to communication device 101. Communication device in turns uses the addresses to transfer data as described herein.

Communication device 101 processes the media path selection data to select a media path for one or more media streams. For example, communication device 101 may determine the type of data being transmitted, quality of service required, latency allowed, location, availability, among other factors in deciding which media path to select. Communication device 101 selects ISP 131 to transmit data to the host. In some embodiments, the receiving device performs a similar process to select a media path to device 101. Furthermore, there may be different media paths for egress and ingress.

During the transmission of data, communication device 101 and/or an application running on device 101 may monitor the communication link to determine data transmission quality, which may include data related to data loss, errors, speed, etc. In some embodiments, this data is collected by the application associated with the transmitted media streams. In another embodiment, it may be a separate application used for media path selection, which may be hidden from the user. The information related to transmission quality is sent to the PPM/SM and/or other centralized device in charge of media path selection policy. If the data transmission quality decreases than the PPM/SM may update the media path selection policy and send an updated media path selection policy to communication device 101. In this example, ISP 131 becomes unavailable and communication device 101 receives the updated media path selection policy and switches to ISP 133 for data transmission.

Figure 4:
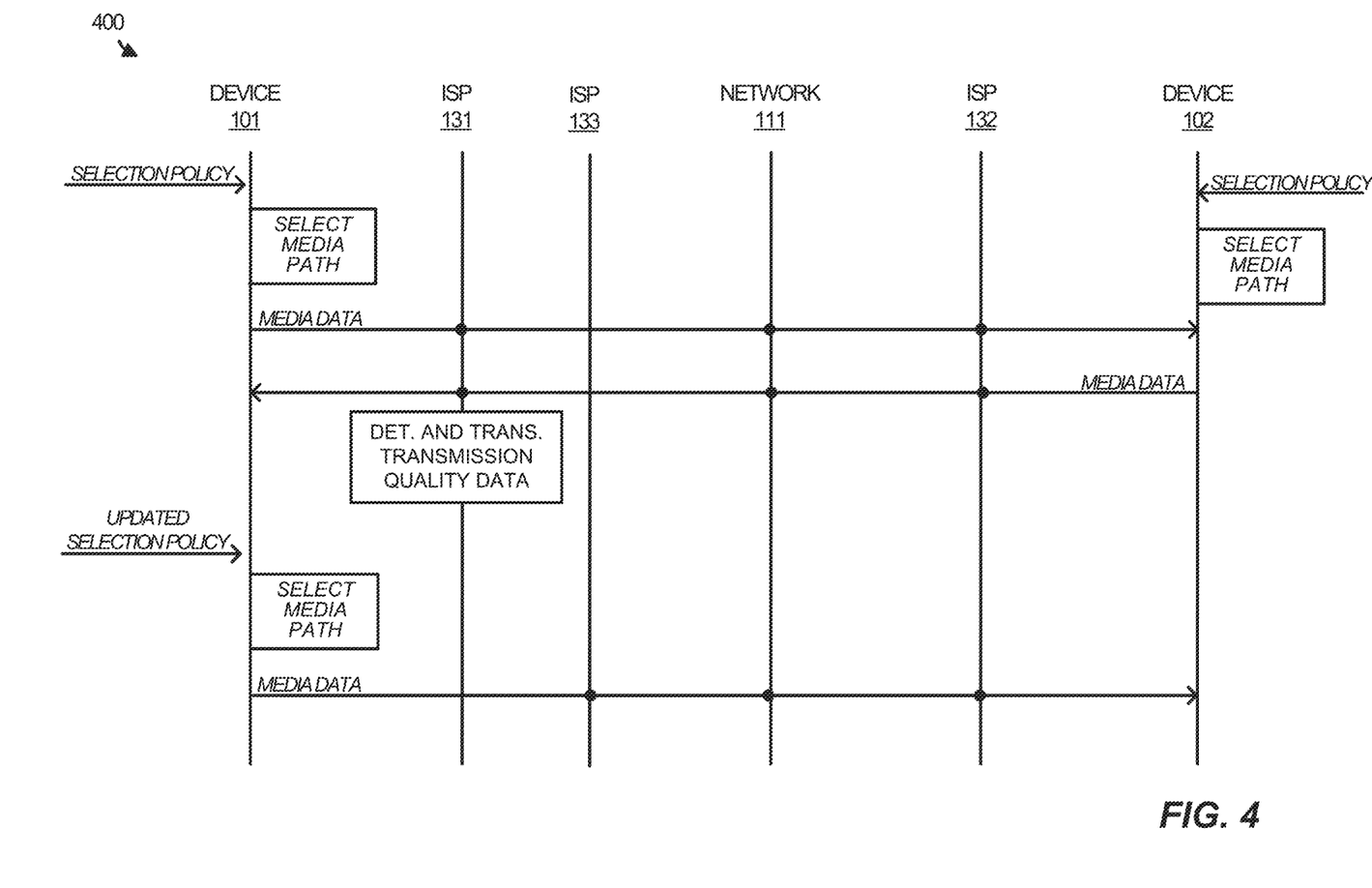
FIG. 4 is another flow diagram depicting media transfer using media path selection in accordance with embodiments of the present disclosure.

FIG. 4 illustrates another example of process 200. Communication devices 101-102 receive a media path selection policy. In some embodiments, the devices 101-102 receive the same policy, in other embodiments, the policies may be different and based on the device's location. In this example, device 101-102 are establishing a communication session with each other—such as a video call. Each of communication devices 101-102 selects one or more media paths for one or more media streams. Communication device 101 selects ISP 131 and 132 and device 102 selects 132 and 131. As shown in FIG. 1B each device selects a local egress ISP and a remote ingress ISP, not shown for clarity. Each device transmits media data over the selected media paths. For example, each device transmits their media data to a server that collects and re-transmits the aggregated data to devices 101-102, this server is not shown for clarity. It is detected that ISP 132 becomes unavailable, for example, an earthquake could case ISP 132 to become unavailable. It is understood, that either the local or remote ISP may become unavailable, and device 101 may select another remote ISP (e.g. disaster recovery). In some embodiments, ISP 133 is designated for disaster recovery.

Device 101 may request an updated media path selection policy in order to select a new media path. In some embodiments device 101 uses the original media path selection policy to select a new media path when ISP 131 becomes unavailable. Advantageously, media path selection may be dynamic and in the event of service outages, media streams may be transferred to other available media paths. Additionally, one media path may be used to transmit two or more media streams.

In some embodiments, a sending device may receive a list of destination addresses. For example, the receiving device may transfer a list of available and/or preferred destination addresses. The sending device selects a source address using the policy table and selects a destination address using the policy table and the list of received addresses. For example, the sending device may select the prefixes for the source and destination addresses. In other words, the destination address is selected by applying the policy table to the received list of destination addresses. In selecting the source and/or destination addresses, the policy table may consider the destination, media type, application, service requirements, price, available routes, etc.

Advantageously, the policy table has a local egress ISP and a remote ingress ISP and their associated egress and ingress router addresses. By allowing the host or sending device to select two ISPs, the sending device selects the first hop egress router and the remote default router. Currently solution do not allow the sending device to select the remote ISP. That is to say, multihomed devices can select a source and destination address, based on an application driven policy table. OS standard algorithms will transfer the media over the appropriate egress and ingress ISP based on the selected addresses.

Figure 5A:
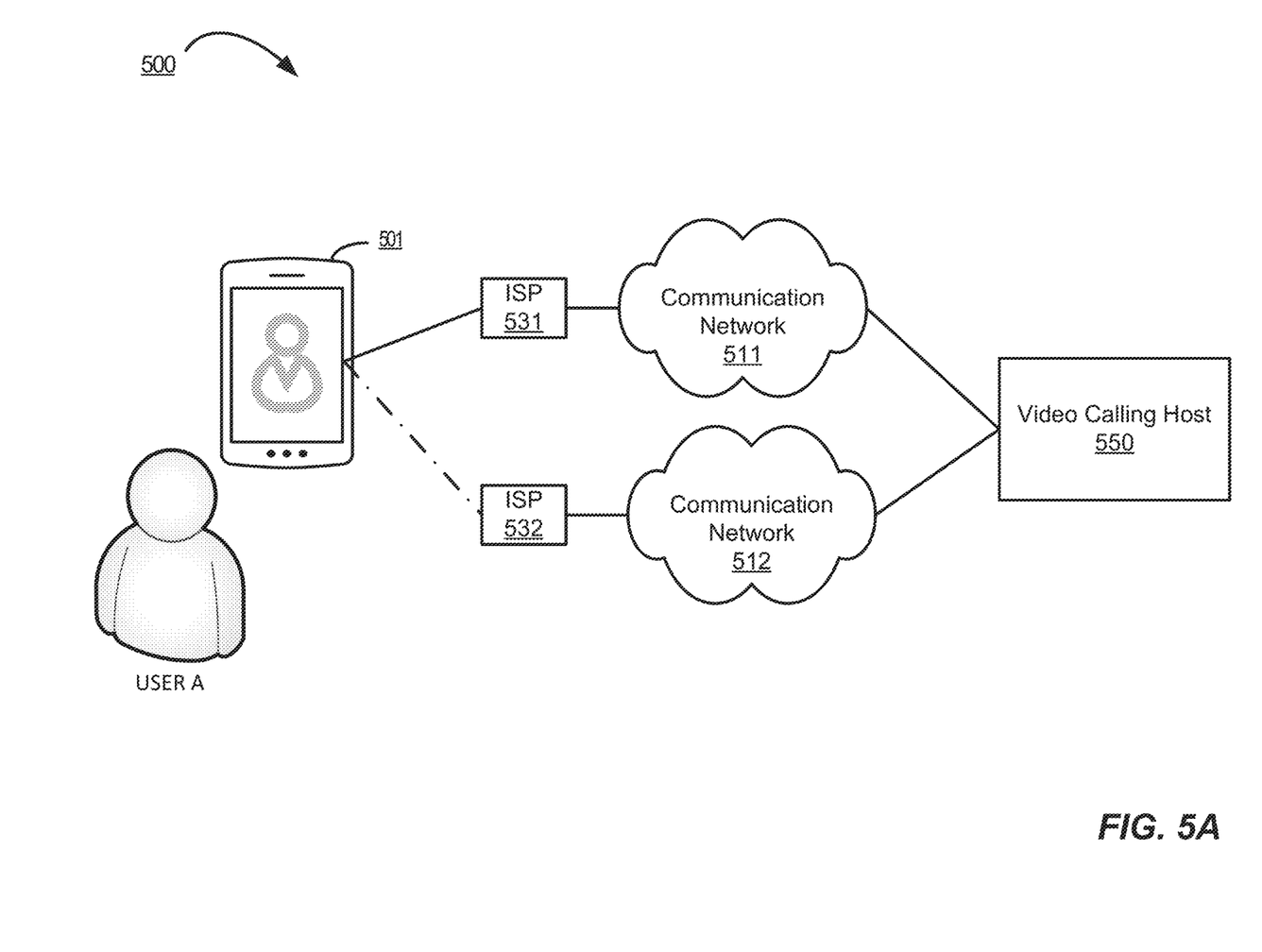
FIG. 5A is a block diagram depicting an additional embodiment in accordance with the present disclosure.

FIG. 5A illustrates communication environment 500, in which user A is engaged in a video call on device 501. For example, the video call may be conducted using a video calling service provided by video call host 550. Communication networks 511-512 provide access to video calling service 550. In some embodiments, communication network 511 comprises an IPv4 network and communication network 512 comprises an IPv6 network. As illustrated, ISP 531 connects device 501 to communication network 511, while ISP 532 connects device 501 to communication network 512.

Advantageously, the data associated with the video call may be transferred over different ISPs/networks. For example, video data may be transferred using ISP 531 to video call host 550 and voice data may be transferred using ISP 532. In some embodiments, the media paths are selected based on the type of service associated with the media stream. In this example, the voice data may be more critical to the service, while the video data supplements, and therefore, voice data is transferred over a higher quality connection. Other devices, which are not shown for clarity, may be connected to video call host 550, for example, the device associated with the user in the video call with user A.

Figure 5B:
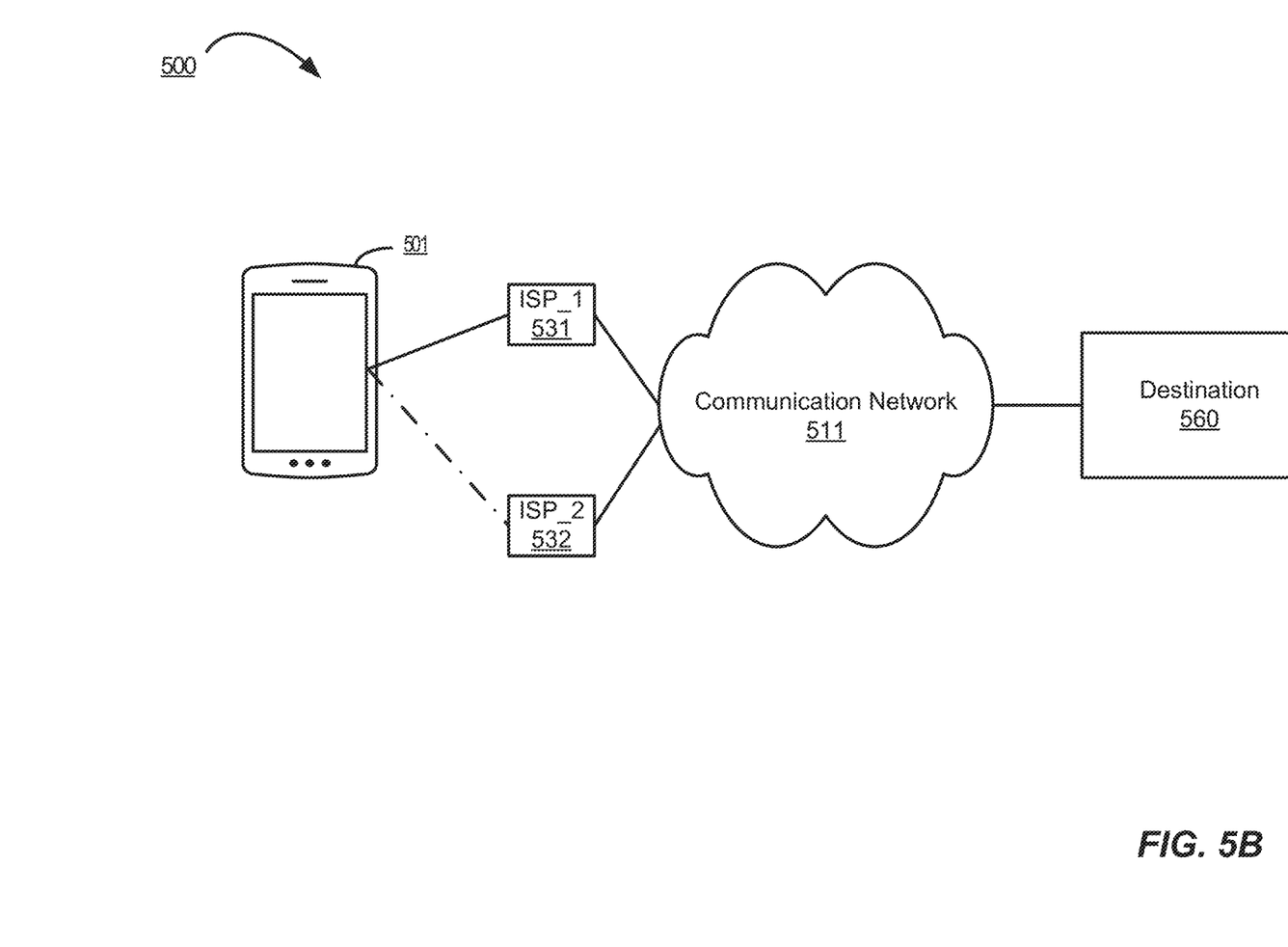
FIG. 5B is a block diagram depicting an additional embodiment in accordance with the present disclosure.

FIG. 5B illustrates an alternative embodiment of communication environment 500. For example, device 501 wants to send audio to destination 560. Device 501 may select one of two ISPs ISP_1 531 and ISP_2 532 to send the audio. In this example, ISP_1 may have the prefix 1000xxx and ISP_2 has the prefix 2000xxx. According to the configuration policy, audio should be transferred over ISP_1 or prefix 1000xxx, however the policy table indicates device 501 should use addresses with a 2000 prefix, so device 501 transfers audio over ISP_2.

Figure 6:
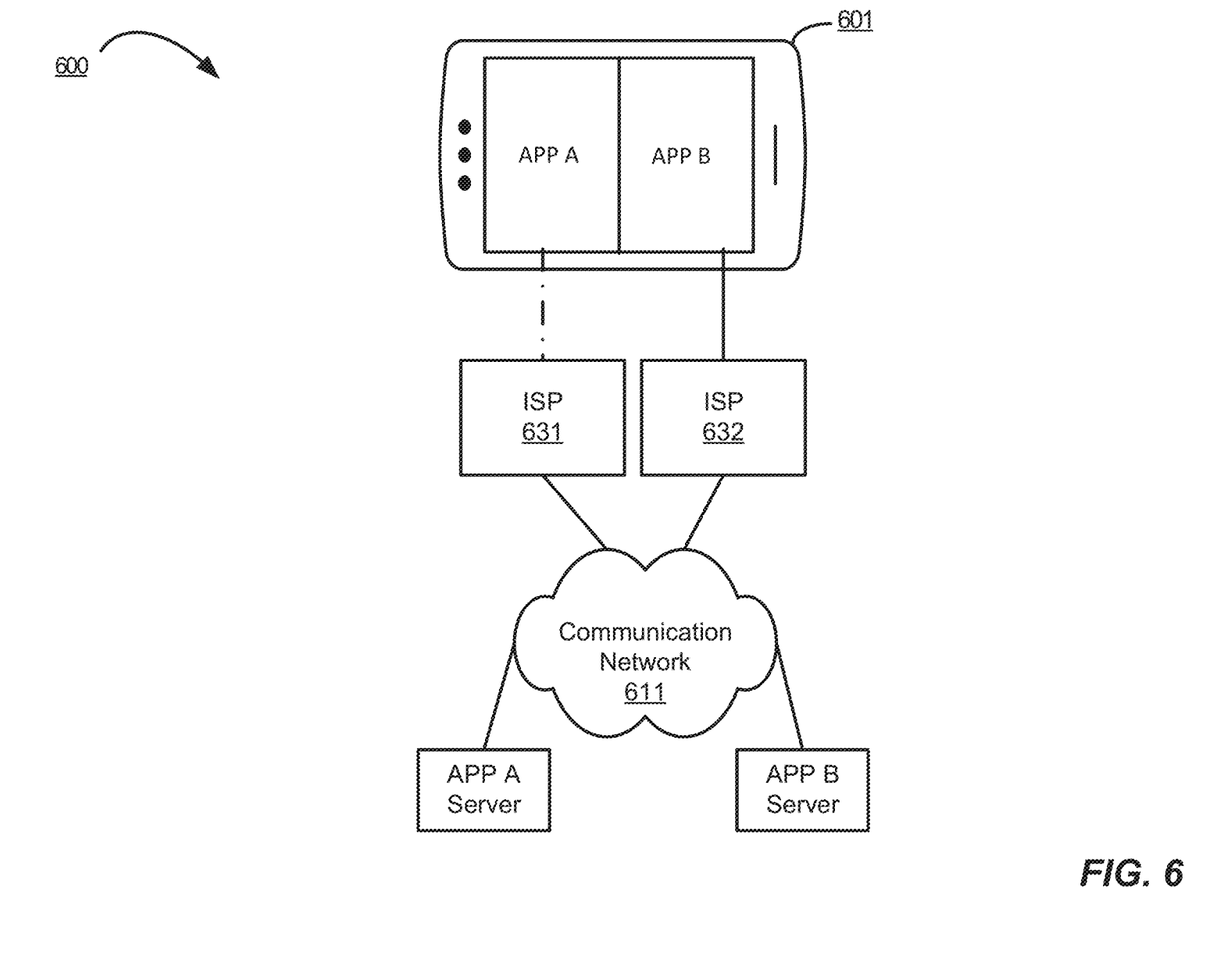
FIG. 6 is a block diagram depicting another embodiment of media path selection in accordance with the present disclosure.

FIG. 6 illustrates communication environment 600, in which two applications are executing on device 601. For example, App A may be a media streaming application and App B may be a messaging application. ISPs 631-632 connect device 601 to communication network 611 in order to interact with the app servers for App A and App B. Device 601 may receive media data from the App A server via ISP 631 and messaging data from the App B server via ISP 632. Not shown for clarity, App servers A and B may also be connected to ISPs that were selected using the same or a different media path selection policy.

Figure 7:
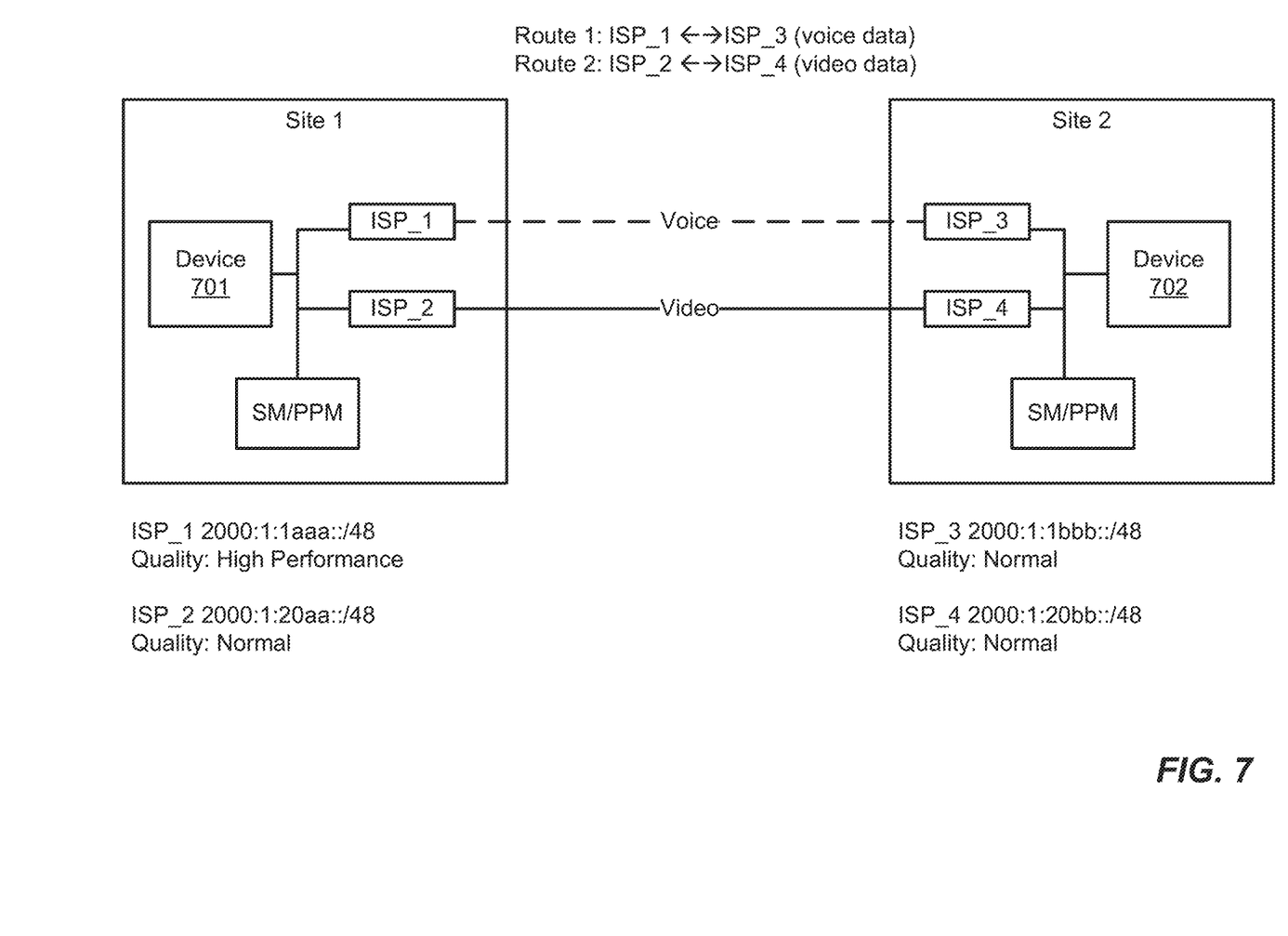
FIG. 7 illustrates another embodiment of media path selection in accordance with the present disclosure.

FIG. 7 illustrates another example embodiment 700 for selecting media paths. In this example, enterprises at Site 1 and Site 2 can send voice data to high performance ISPs and video data to lower performance ISPs by setting their policy tables accordingly. In some examples, if site 1 and site 2 are operated by the same entity, the local and remote ISP policies may be configured by that entity. In other examples, if site 1 and site 2 are operated by different entities, the entities each configure the policies for their local ISPs. If the transmission quality for the voice data over the high performance ISP drops or the selected ISP becomes unavailable, the media path selection policy can be used to re-route the media stream associated with the voice data to another ISP.

The communication devices 701-702 receive the media path selection policies from their respective PPM/SM systems. When device 701 (addresses 2000:1:1aaa:100 and 2000:1:20aa::100) calls device 702 (addresses 2000:1:1bbb::300 and 2000:1:20bb::300), device 701 will select a source address and local ISP based on the media path selection policy (2000:1:1aaa::100 source address for voice data and 2000:1:20aa::100 source address for video data). Device 701 will also select the destination address and destination ISP based on the policy table (2000:1:bbb::300 remote address for voice data and 2000:1:20bb::300 remote address for video data).

Figure 8:
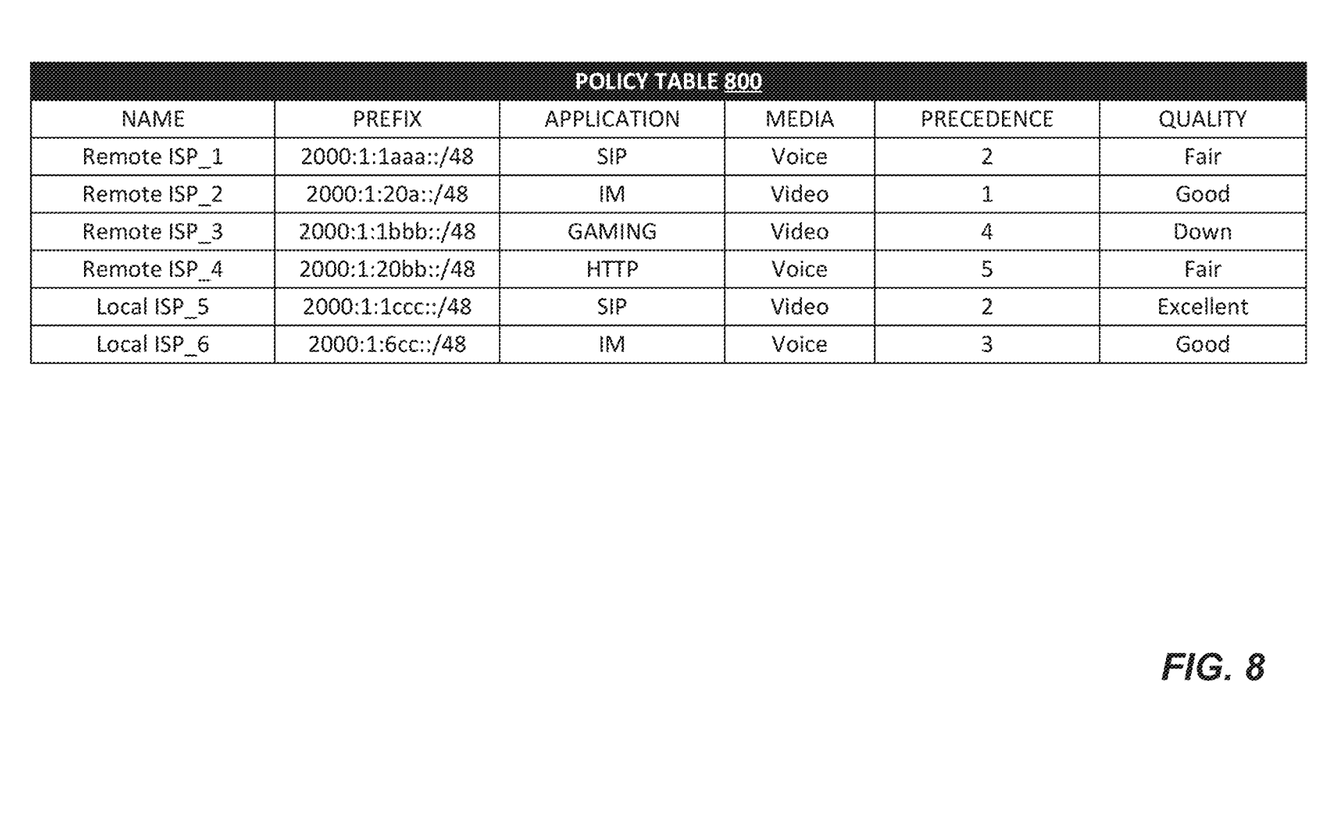
FIG. 8 is an example media path selection policy table used to select media paths in accordance with embodiments of the present disclosure.

FIG. 8 illustrates an example media path policy selection table, although other data formats are possible and in accordance with the embodiments described herein.

Media path selection policy table comprises the fields/columns "Name," "Prefix," "Application," "Media," "Precedence," and "Quality." The columns listed in policy table 800 are for illustrative purposes only, and not all columns are required, additionally, the policy table may include other columns not listed in this example. The "Name" field may list a name for the ISP. The "Prefix" field may list a prefix and/or address for the ISP and/or host. The "Application" field may list the type of communication protocol for the ISP. The "Media" field may list the type of data that may be transmitted. The "Precedence" field may list the ranking for the ISP. For example, an ISP with a higher precedence may be selected before an ISP with a lower precedence or vice versa. The "Quality" field may list a transmission quality and/or may indicate whether the ISP is reachable/available.

For example, a communication device may receive the data in policy table 800 from a centralized system such as a PPM and/or SM and process the policy table to select media paths for the multiple media streams being transferred to and/or from the device. In other examples, policy table 800 may be transferred to a web host, which uses policy table 800 to configure web addresses. In yet another example, an enterprise user may use policy table 800 to track web addresses used by the various websites. In some embodiments, the policy table has a local egress ISP and a remote ingress ISP and their egress and ingress router addresses. The hosts may select two ISPs (i.e., the first hop egress router and a remote default router).

Figure 9:
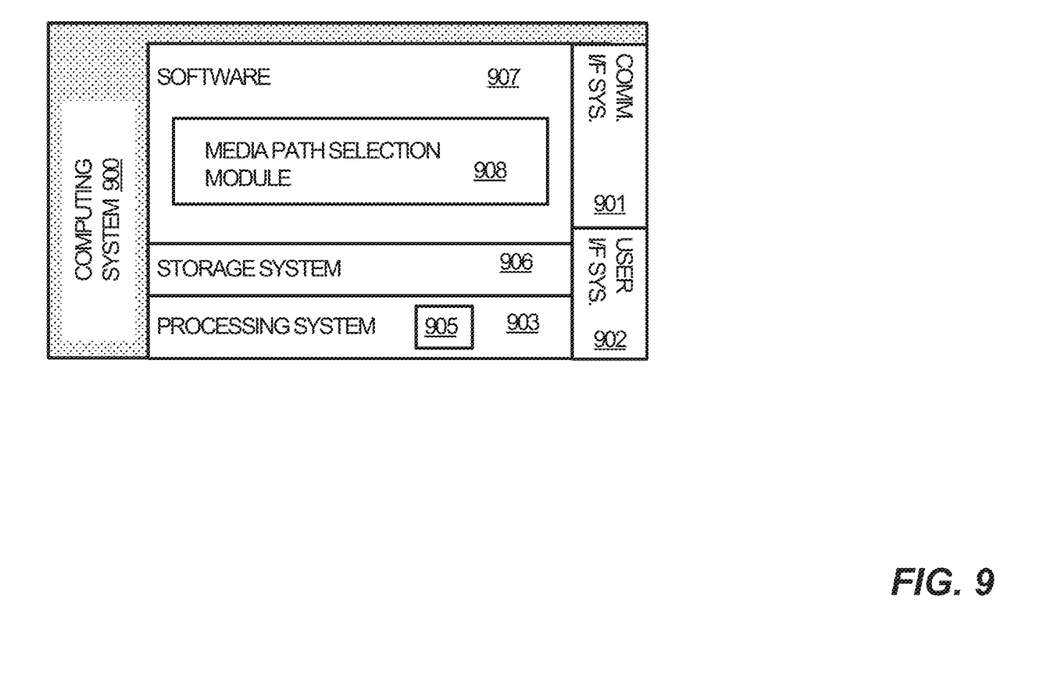
FIG. 9 is a block diagram of a computer used to implement the method to select media paths in accordance with embodiments of the present disclosure.

FIG. 9 illustrates computing system 900 used to select one or more media paths as described herein, according to one implementation. Similar computing systems may be included in the PPM/SM system described herein used to generate the media path selection policies. Computing system 900 is representative of any computing system or systems with which the various operational architectures, processes, scenarios, and sequences disclosed herein for providing a communication service and selecting media paths may be implemented.

Computing system 900 is an example of communication devices 101-102, 501, 601, and 701-702, although other examples may exist. Computing system 900 comprises communication interface 901, user interface 902, and processing system 903. Processing system 903 is linked to communication interface 901 and user interface 902. Processing system 903 includes a microprocessor and/or processing circuitry 905 and memory device 906 that stores operating software 907. Computing system 900 may include other well-known components such as a battery and enclosure that are not shown for clarity. Computing system 900 may comprise a server, a user device, a desktop computer, a laptop computer, a tablet computing device, or some other user communication apparatus.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In some implementations, communication interface 901 is configured to communicate with other end user devices, wherein the communication interface is used to transfer and receive voice communications for the devices. Further, communication interface 901 may interface with a webservice, wherein the service may comprise a media streaming service, gaming service, a food ordering service, online banking service, or some other similar service that can be accessed via a website.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises a microprocessor and other circuitry that retrieves and executes operating software 907 from memory device 906. Memory device 906 may include volatile and nonvolatile, removable and non-removable media implemented in any method or technology for storage of information, such as computer readable instructions, data structures, program modules, or other data. Memory device 906 may be implemented as a single storage device, but may also be implemented across multiple storage devices or sub-systems. Memory device 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes media path selection module 908, although any number of software modules within the application may provide the same operation. Operating software 907 may further include an operating system, utilities, drivers, network interfaces, applications, or some other type of software. When executed by processing circuitry 905, operating software 907 directs processing system 903 to operate computing system 900 as described herein.

In at least one implementation, media path selection module 908, when read and executed by processing system 903, directs processing system 903 to selection one or more media paths for media streams associated with executing applications. For example, a phone application may exchange voice communications with one or more other end user devices. In another example, a video conferencing application may exchange voice and video data with a video conferencing server.

It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of selecting media paths, the method comprising:
receiving a media path selection policy;
receiving a list of destination addresses from a receiving node;
selecting, at a source node, a source address based on the media path selection policy, wherein selecting the source address causes a first hop egress router to be selected by the source node;
selecting, at the source node, a destination address from the list of destination addresses based on the media path selection policy, wherein selecting the destination address causes a remote router to be selected by the source node, and wherein the remote router is different from the first hop egress router; and
transferring media using the selected source address, the first hop egress router, the remote router, and the destination address.

2. The method of claim 1, wherein selecting the source address based on the media path selection policy comprises selecting the source address based on an application transferring the media.

3. The method of claim 1, wherein selecting the source address based on the media path selection policy comprises selecting the source address based on a required quality of service.

4. The method of claim 1, wherein selecting the source address based on the media path selection policy comprises selecting the source address based on a preferred Internet Service Provider (ISP).

5. The method of claim 1, wherein selecting the source address based on the media path selection policy comprises selecting the source address based on remote ingress filtering.

6. The method of claim 1, wherein selecting the source address based on the media path selection policy comprises selecting the source address based on price.

7. The method of claim 1, wherein selecting the source address based on the media path selection policy comprises selecting the source address based on a delay tolerance.

8. The method of claim 1, wherein selecting the source address based on the media path selection policy comprises a user selecting the source address.

9. A method of selecting media paths in a communication session comprising multiple media streams, the method comprising:
receiving a media path selection policy;
selecting a first media path for a first media stream among the multiple media streams based on the media path selection policy, wherein the first media path comprises a selected first hop egress router and a selected remote router;
transferring the first media stream over the first media path;
selecting a second media path different from the first media path for a second media stream among the multiple media streams based on the media path selection policy, wherein the second media path excludes at least one of the selected first hop egress router and the selected remote router; and
transferring the second media stream over the second media path, wherein the second media stream is transferred over the second media path substantially simultaneous with the first media stream being transferred over the first media path.

10. The method of claim 9, wherein the first media stream is transferred using IPv4 protocol and the second media stream is transferred using IPv6 protocol.

11. The method of claim 9, further comprising:
monitoring a transmission quality for each individual media stream over each individual media path; and
reporting the transmission quality for each of the individual media streams.

12. The method of claim 9, further comprising:
receiving an updated media path selection policy;
selecting, based at least in part on the updated media path selection policy, a new media path for at least one of the first and second media streams; and
transferring the at least one of the first and second media streams to the selected new media path.

13. The method of claim 9, wherein the first media path is associated with a first application on a communication device and the second media path is associated with a second application on the communication device.

14. The method of claim 9, wherein the communication session comprises a video call, wherein the first media stream comprises video data from the video call, and wherein the second media stream comprises voice data from the video call.

15. The method of claim 9, wherein the communication session is on a multi-homed communication device.

16. A system to select media paths in a communication session comprising multiple media streams, the system comprising:
a communication interface configured to receive a media path selection policy;
a processor configured to process the media path selection policy to select a first media path for a first media stream among multiple media streams based on the media path selection policy, wherein the first media path comprises a selected first hop egress router and a selected remote router;
the communication interface configured to transfer the first media stream over the first media path;
the processor configured to select a second media path different from the first media path for a second media stream among the multiple media streams based on the media path selection policy, wherein the second media path excludes at least one of the selected first hop egress router and the selected remote router; and the communication interface configured to transfer the second media stream over the second media path, wherein the second media stream is transferred over the second media path substantially simultaneous with the first media stream being transferred over the first media path.

17. The system of claim 16, wherein the first media path uses IPv4 protocol and the second media path using IPv6 protocol.

18. The system of claim 16, further comprising:

the processor configured to monitor a transmission quality for each individual media stream over each individual media path and report the transmission quality for each of the individual media streams.

19. The system of claim 16, further comprising:

the communication interface configured to receive an updated media path selection policy;

the processor configured to select, based at least in part on the updated media path selection policy, a new media path for at least one of the first and second media streams; and the communication interface transfers the at least one of the first and second media streams to the selected new media path.

20. The system of claim 16, wherein the first media path is associated with a first application on a communication device and the second media path is associated with a second application on the communication device.

\* \* \* \* \*